(12) United States Patent
Takahashi et al.

(10) Patent No.: US 7,787,712 B2
(45) Date of Patent: Aug. 31, 2010

(54) ELECTRONIC DOCUMENT CREATING APPARATUS

(75) Inventors: Sadao Takahashi, Yokohama (JP); Tomohiko Beppu, Kawasaki (JP); Hirofumi Horikawa, Yokohama (JP); Yuuta Hamada, Tokyo (JP); Satoshi Suga, Yokohama (JP); Toshiyuki Furuta, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 996 days.

(21) Appl. No.: 11/543,559

(22) Filed: Oct. 4, 2006

(65) Prior Publication Data
US 2007/0076984 A1    Apr. 5, 2007

(30) Foreign Application Priority Data
Oct. 5, 2005    (JP)    ............................. 2005-292515

(51) Int. Cl.
*G06K 9/60* (2006.01)
(52) U.S. Cl. ...................... 382/305; 358/1.17; 358/1.18; 382/188; 382/284; 707/E17.008; 715/209; 715/255
(58) Field of Classification Search .............. 358/1.15, 358/1.18, 403, 474, 478; 382/176, 181, 187, 382/188, 305; 707/3, 4, 5, 6, 511; 715/205, 715/209, 210, 255
See application file for complete search history.

(56) References Cited

U.S. PATENT DOCUMENTS

| 6,396,598 | B1 * | 5/2002 | Kashiwagi et al. .......... 358/474 |
| 6,631,495 | B2 * | 10/2003 | Kato et al. ................... 715/255 |
| 7,131,061 | B2 * | 10/2006 | MacLean et al. ............ 715/210 |
| 7,475,061 | B2 * | 1/2009 | Bargeron et al. ................ 707/3 |
| 7,489,415 | B2 * | 2/2009 | Furuta et al. ............... 358/1.15 |
| 7,584,413 | B2 * | 9/2009 | Takaoka et al. ............. 715/209 |
| 2001/0011283 | A1 * | 8/2001 | Kato et al. ................... 707/511 |
| 2003/0103238 | A1 * | 6/2003 | MacLean et al. ........... 358/1.18 |
| 2005/0165747 | A1 * | 7/2005 | Bargeron et al. ................ 707/3 |
| 2005/0219616 | A1 * | 10/2005 | Furuta et al. ............... 358/1.18 |

FOREIGN PATENT DOCUMENTS

| JP | 2000-331031 | 11/2000 |
| JP | 2005-122682 | 5/2005 |

* cited by examiner

*Primary Examiner*—Gregory M Desire
(74) *Attorney, Agent, or Firm*—Cooper & Dunham LLP

(57) ABSTRACT

An electronic document creating apparatus includes a document information obtaining device that obtains and inputs document identification information put on a sheet document. The document identification information specifies an electronic document stored in a folder. The electronic document serves as an output source of the sheet document. An electronic document extraction device is provided to extract an electronic document based on the document identification information. A new document creation device is provided to create a new electronic document by combining at least two electronic documents extracted by the electronic document extraction device. The new electronic document is stored in a folder.

12 Claims, 13 Drawing Sheets

FIG. 1
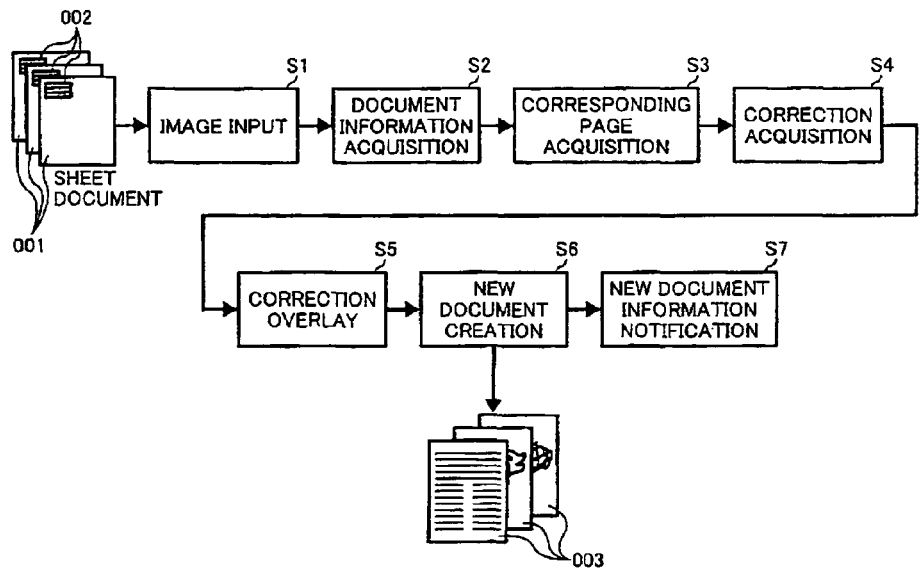
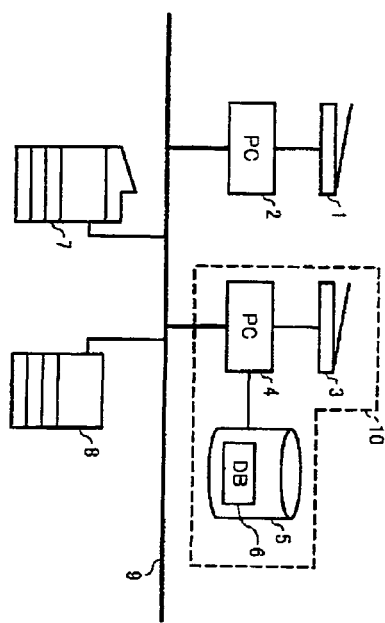
FIG. 2B
| DOCUMENT INFORMATION | DOCUMENT PASS | TOTAL NUMBER OF PAGES | PRINTING PAGE | DOCUMENT CREATION DATE | CREATION TIME |
|---|---|---|---|---|---|
| 1 | C:¥PAPER. DOC | 10 | 1 | 2004/04/14 | 14:56:49 |
| 2 | C:¥PAPER. XLS | 1 | 1 | 2004/04/14 | 14:58:17 |
| 3 | C:¥PAPER. PPT | 5 | 4 | 2004/04/14 | 14:58:58 |
| 4 | C:¥PAPER. TXT | 2 | 2 | 2004/04/14 | 15:08:31 |
FIG. 2A

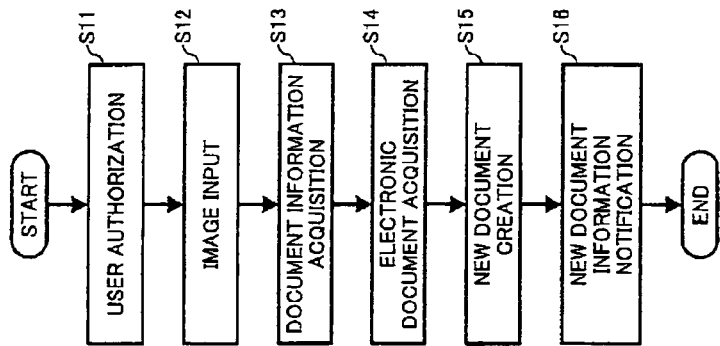
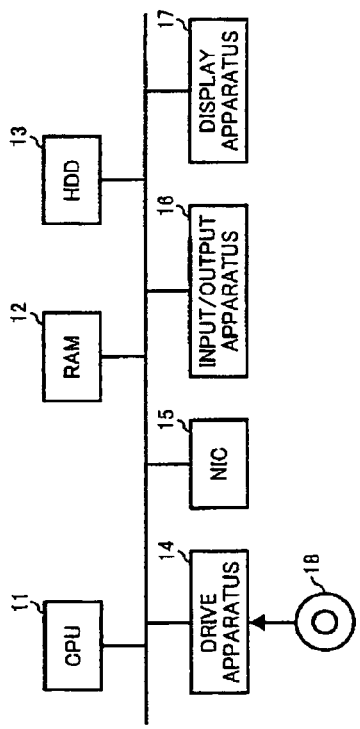
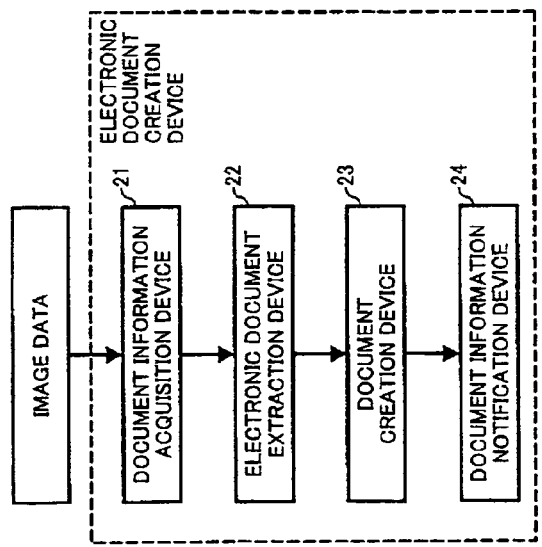

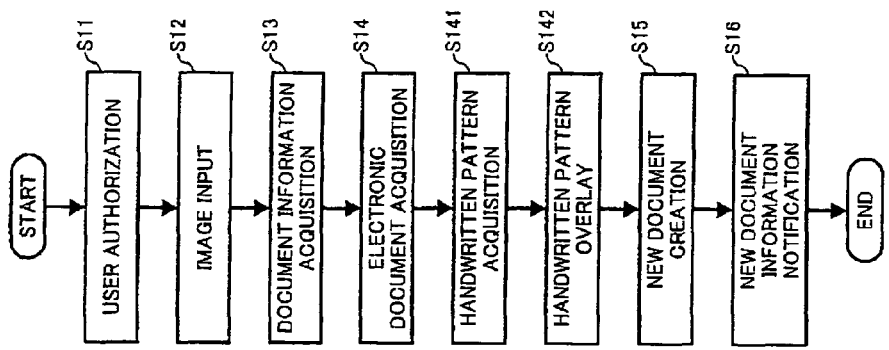
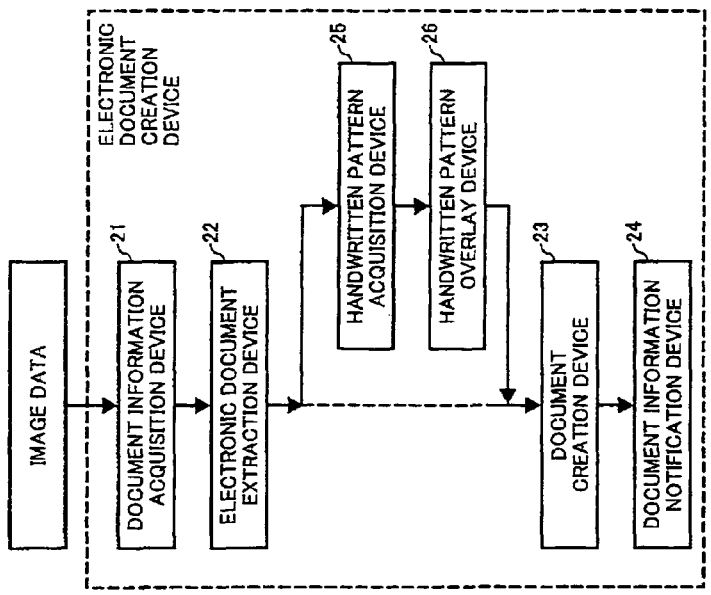
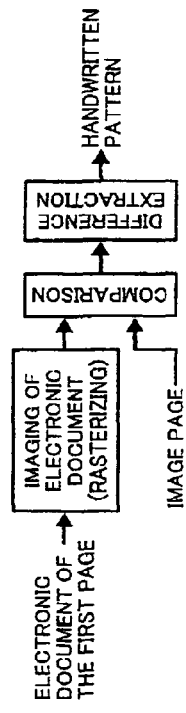

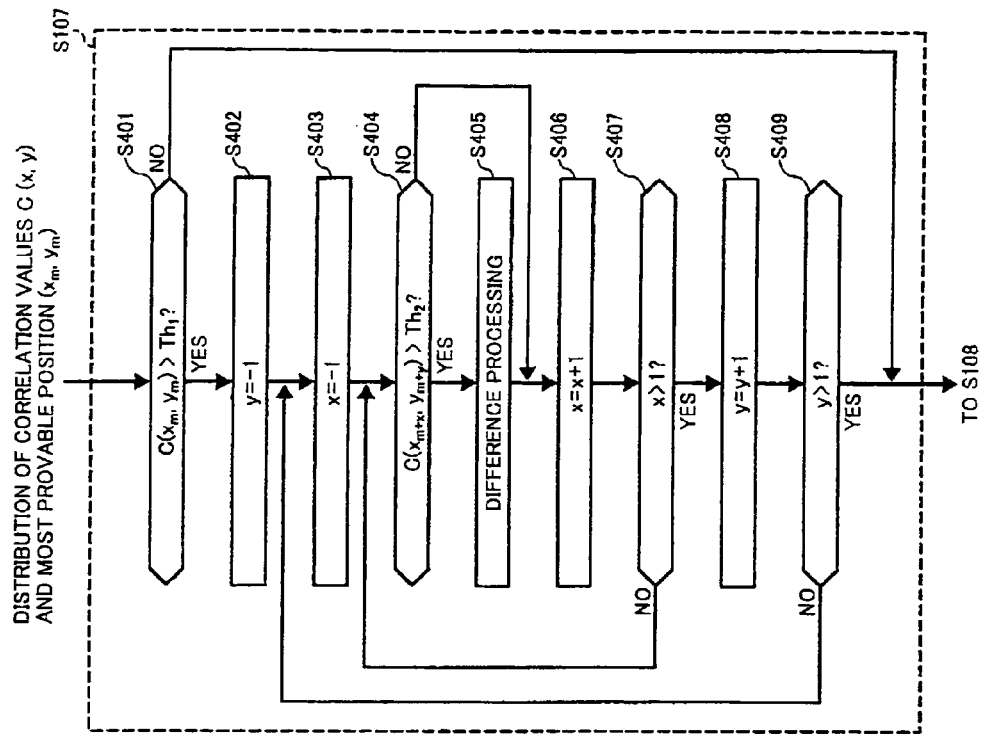
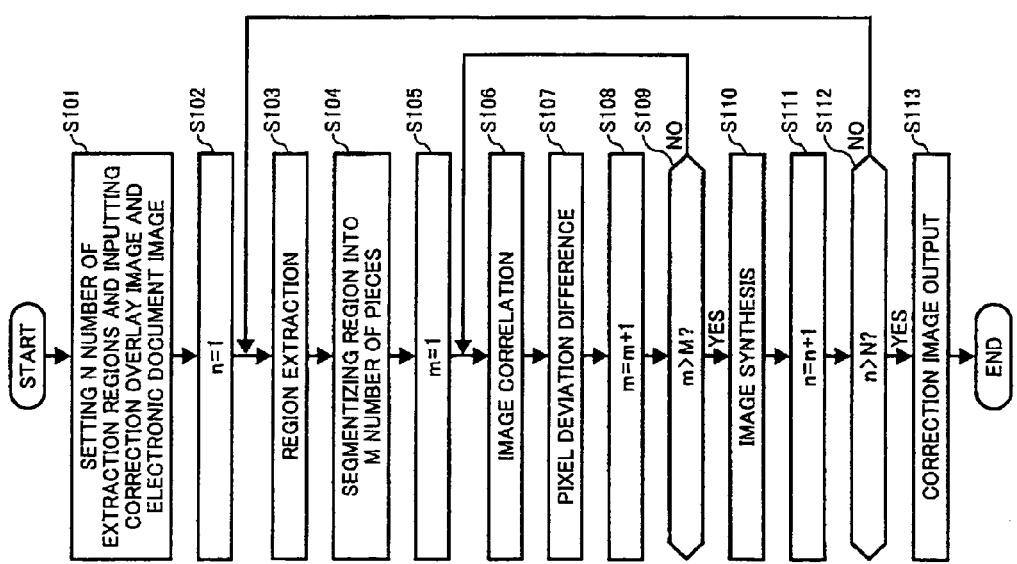

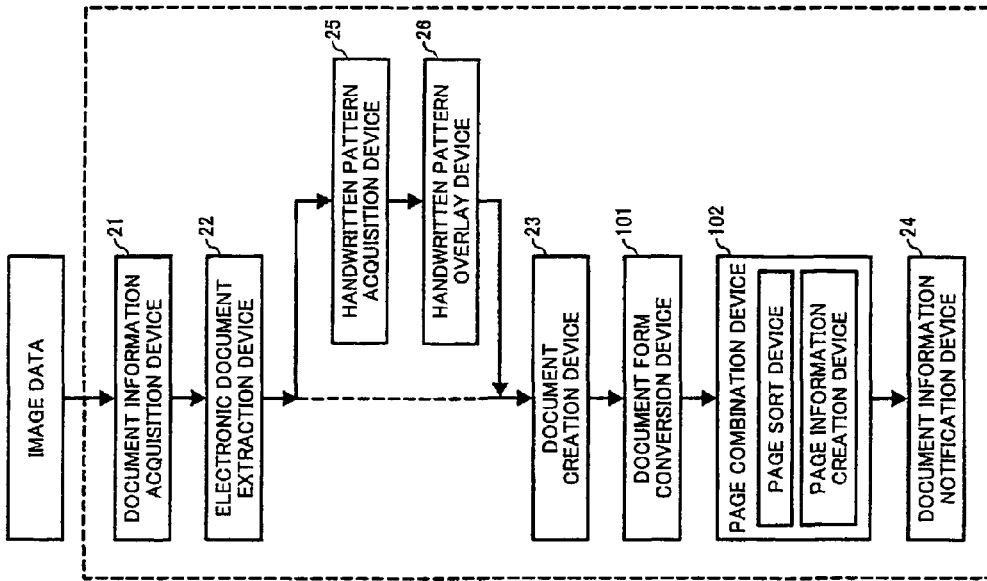

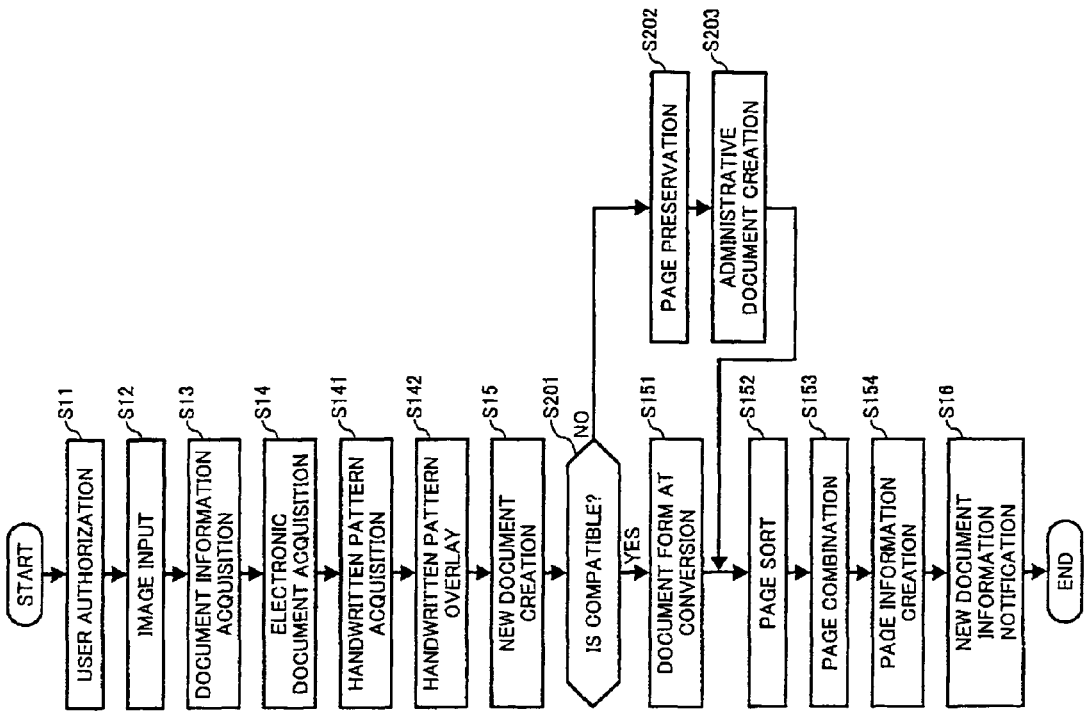

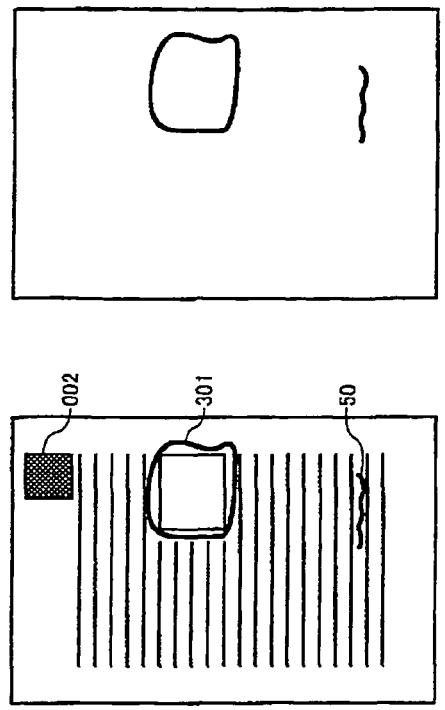
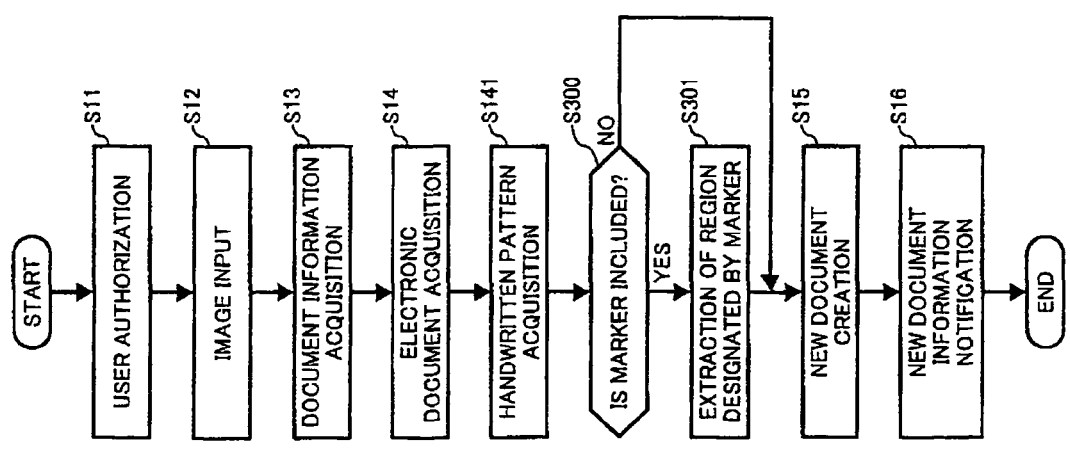

ELECTRONIC DOCUMENT CREATING APPARATUS

TECHNICAL FIELD

The present application relates to electronic document creating apparatuses, and in particular to electronic document creating apparatuses capable of creating an electronic document using a sheet document.

BACKGROUND DISCUSSION

It has been told that age of electronic document golden days needless of paper is coming as a computer system makes progress and spreads. The electronic document is commonly used in deed. However, a quantity of paper practically increases, significantly. That is, a sheet document currently prevails the electronic document in terms of easy edition and the like owing to listing and handling performances. Further because, a mastership level of a user is sometimes insufficient when a keyboard and the like are operated to handle an electronic document. Many people find it more convenient to print out an electronic document on a sheet, and it is practically true when statistics of a usage volume of the sheet document is taken.

Never the less, many people store the electronic document after printing the electronic document onto the sheet. A document previously used in a presentation or the like is sometimes used again. For example, necessary pieces are sometimes extracted from materials previously created for giving presentations to edit and create a new presentation document to be used. Specifically, a desired electronic material is retrieved from an electronic document previously created, and a necessary document and a page is picked up among those to create a new document.

However, it is sometimes burdensome to open much electronic material and extract a prescribed material not only when editing the electronic material for presentation. Then, a technology of combining a plurality of electronic documents like a sheet document has been proposed as discussed in Japanese Patent Application Laid Open NO. 2000-331031. Specifically, a method of creating a document by selecting and combining the plurality of electronic documents and a user interface are proposed.

However, the Japanese Patent Application Laid Open NO. 2000-331031 only handles an electronic document and describes none of methods of extracting a material using the sheet document. Thus, potential needs for using a sheet document can't be satisfied.

Further, when a prescribed material such as a sheet document exists at hand, the sheet document is sometimes inputted to a scanner and a CCD camera, so that it is converted into image data. However, a quality of the sheet document deteriorates on a display when converted into the image data and displayed. Further, image data, especially, color image data, is inconvenient in terms of storage and handling due to a large size of a file. Further, since it is difficult to divide image data into several objects, material including image data converted from a sheet document is not easily edited.

SUMMARY

The present disclosure has been made in view of the above noted and other problems and one object of the present disclosure is to provide a novel electronic document creating apparatus.

Such a novel electronic document creating apparatus includes a document information obtaining device that obtains and inputs document identification information put on a sheet document. The document identification information specifies an electronic document stored in a folder. The electronic document serves as an output source of the sheet document. An electronic document extraction device is provided to extract an electronic document based on the document identification information. A document creation device is provided to create a new electronic document by combining at least two electronic documents extracted by the electronic document extraction device. The new electronic document is stored in a folder.

In another embodiment, the document identification information includes a code created by coding information specifying the electronic document. The document information obtaining device obtains and inputs the document identification information together with image data of the sheet document. The electronic document extraction device extracts the electronic document based on the document information obtained by decoding the document identification information.

In yet another embodiment, the document creation device creates a new electronic document by combining the image data and an electronic document when the document information obtaining device cannot obtain or input the document identification information.

In yet another embodiment, a document information notifying device is provided to notify a user of one of information if the new electronic document is created and a storage location of the new electronic document.

In yet another embodiment, a handwritten pattern obtaining device is provided to compare image data of the sheet document given the document identification information with image data of the electronic document extracted based on the document identification information and to obtain a handwritten pattern added to the sheet document. A pattern overlay device is provided to overlay the handwritten pattern obtained by the handwritten pattern obtaining device on the electronic document.

In yet another embodiment, the electronic document creation device includes a document format conversion device configure to unify a different file format.

In yet another embodiment, an administrative document creation device is provided to collect electronic document information including at least a file format of the electronic document and to store the electronic document information in the folder while linking with each of pages of the new electronic document as an administrative document.

In yet another embodiment, a compatibility determination device is provided to determine if a file format of each of pages of the new electronic document is compatible. A document format conversion device is provided to convert each of pages of the new electronic document into the same file format when the determination is positive.

In yet another embodiment, a page sort device is provided to sort each of pages of the new electronic document. The page sort device assigns a page number based on an order of a sheet document input, a creation date of an electronic document, or a date of updating an electronic document.

In yet another embodiment, a marker detection device is provided to compare the image data of the sheet document with the image data of the electronic document extracted based on the document identification information and to obtain a marker additionally written on the sheet document. A document creation device is provided to extract and store information within in a region designated by the marker detected by the marker detection device as a prescribed file.

BRIEF DESCRIPTION OF DRAWINGS

A more complete appreciation of the present disclosure and many of the attendant advantages thereof will be readily obtained as the same becomes better understood by reference to the following detailed description when considered in connection with the accompanying drawings, wherein:

FIG. 1 illustrates an outline of exemplary electronic document creation;

FIG. 2 illustrates an exemplary configuration of an electronic document creation system;

FIG. 3 illustrates an exemplary configuration of hardware of a computer;

FIG. 4 is a block chart illustrating an exemplary function of an electronic document creation device that controls a computer to operate as an electronic document creation apparatus;

FIG. 5 is a flowchart illustrating an exemplary sequence for creating an electronic document;

FIG. 11 illustrates exemplary functional blocks of the electronic document creation device capable of extracting and reflecting a handwritten pattern to a new electronic document;

FIG. 12 is a flowchart illustrating an exemplary process for extracting and reflecting a handwritten pattern to a new electronic document;

FIG. 13 is a flowchart illustrating an exemplary sequence of extracting the handwritten pattern;

FIG. 14 is a flowchart illustrating an exemplary specific sequence in step S107 of FIG. 13;

FIG. 18 illustrates an exemplary function of an electronic document creation device according to the second embodiment;

FIG. 19 illustrates exemplary page information;

FIG. 22 illustrates an exemplary compatibility determination table;

FIG. 23 is a flowchart illustrating an exemplary process for creating a new electronic document in accordance with a compatibility of the new electronic document;

FIG. 26 is a flowchart illustrating an exemplary process for creating a new electronic document when a marker and a handwritten pattern are partially drawn on the sheet document;

FIG. 27 is a chart illustrating exemplary region designation by means of a marker.

PREFERRED EMBODIMENTS

Figure 6:
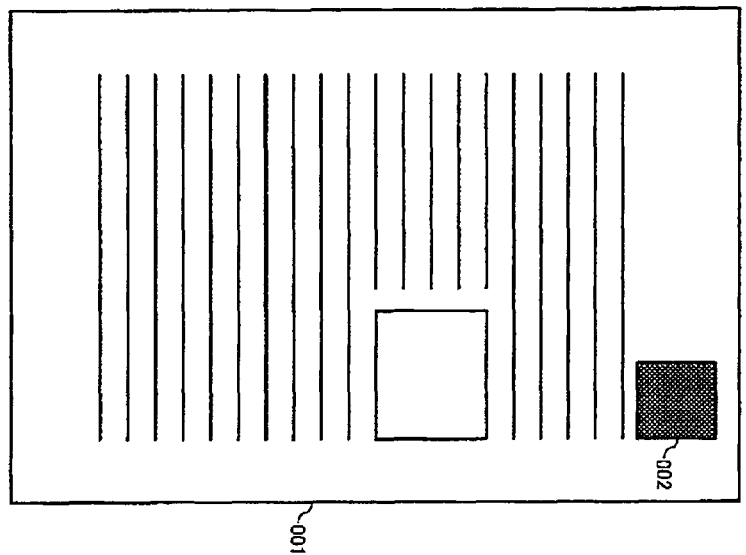
FIG. 6 illustrates an exemplary sheet document 001.

Referring now to the drawings, wherein like reference numerals and marks designate identical or corresponding parts throughout several figures, in particular in FIG. 1, an exemplary electronic document process is described.

As shown, one or more sheet documents 001 are inputted to an electronic document creating apparatus (S1). A document identification information 002 for identifying an electronic document serving as an output source for the sheet document is printed on the sheet document 001. The sheet document is inputted by an image inputting apparatus, such as a scanner, a CCD camera, etc., to be image data, and document identification information 002 is decoded thereby document information is obtained (S2).

Since the document information relates to a storage location of an electronic document, a file identification, and a page number thereof, and so on, an electronic document corresponding to the sheet document 001 can be obtained from a folder storing the electronic document (S3).

Then, if correction with a handwritten pattern is present on the sheet document, the pattern is obtained. Such a pattern can be extracted by comparing image data with a rasterized electronic document corresponding to the image data and detecting a difference therebetween. When written information is included, such information is overlaid on the corresponding electronic document in the prescribed folder as an object (S5).

Further, a new electronic document (hereinafter referred to as a new electronic document 003) is created by combining each of pages of one or more electronic documents obtained. Specifically, a plurality of pages are combined. Then, a page number is assigned to the pages to be accessed later in turn.

After the new electronic document is created, a notification including a creation location and a name of the new electronic document or the like are transmitted to a user who uses an electronic document creation apparatus by electronic mail (S7).

Thus, the user can obtain a newly edited electronic document only by inputting a desired sheet document 001 to the image inputting apparatus, while avoiding inconvenience caused by voluminous image data. Because, a preexisting electronic document is used.

Now, an exemplary electronic document creating system is described with reference to FIG. 2A. As shown, an electronic document creation system includes computers 2 and 4, scanners 1 and 3, a copier 7, and a printer 8. Each of the devices is connected to a network 9. The computer is enabled to access a storage apparatus 5. The storage apparatus 5 includes a document db 6 storing electronic documents.

As shown in FIG. 2B, linking with the document information of the document identification information, a document path indicating a storage location of an electronic document, a total page number indicating a number of total pages of an electronic document, a printing page indicating page numbers already printed, a document creation date when an electronic document was created, and a creation time when an electronic document was created are stored. Thus, a prescribed page of an electronic document can be extracted based on document identification information from the document database 6.

Since an electronic document creating apparatus is at least needed to obtain image data of a sheet document and an electronic document from the document database 6 based on document information, the scanner apparatus 3, the computer 4, and the storage apparatus 6 collectively constitute the electronic document creating apparatus 10 in this embodiment. Accordingly, the electronic document creating apparatus can be constituted by either a combination of a scanner apparatus 1, a computer 2, and a storage apparatus 6, or a combination of a copier 7 with a scanner and a computer, and a storage apparatus 6. When the copier 7 is used as a scanner apparatus, the electronic document creating apparatus can be constituted by the copier 7, a computer 2 or 4, and a storage apparatus 6.

The scanner apparatus 3 executes imaging on a solid state imaging element with a reflection light obtained by emitting a reading light to an original document, and converts into a digital signal having a prescribed number of bits through A/D conversion.

A digitized signal from the solid-state image sensing element undergoes pixel calculation, such as shading correction, background removal, color tone correction, brightness unevenness correction, etc., in an image processing unit (IPU).

The scanner apparatus 3 can be either a type in which a surface of an original document to be read pressure contacts a platen glass or that in which a reading surface is upwardly held and receive photographing. Further, the solid-state image sensing element can be either a one-dimensional imaging element arranged on one dimension or a two-dimensional imaging element having elements arranged on two dimensions.

The copier 7 can be a multifunctional machine including scanning, printing, and facsimile functions or the like. When operating as a copier, the copier 7 prints image data of an original document obtained by the scanning function on a sheet using a well-known printing system, such as a laser, a LED, an inkjet, etc. For example, when the laser system is employed, a latent image is formed corresponding to an image to be formed, while a photo-conductive member (a rotational drum) rotates, receives uniform charge from a charger apparatus, and receives emission of a laser at an exposure region from an exposure device.

The latent image on the photo-conductive member reaches a developing apparatus as the photo-conductive member rotates, and is visualized with toner in the developing apparatus, thereby a toner image is formed. A transfer sheet is fed from a sheet feeding tray and receives transfer of the toner image of the photo-conductive member in a transfer apparatus. The toner image then melts and adheres to the transfer sheet. The printer apparatus 8 executes printing on a sheet using the well-known printing system.

Exemplary hardware of the computer 2 or 4 is now described with reference to FIG. 3. As shown, the computer 4 includes a CPU 11, a RAM 12, a HDD (Hard Disc Drive) 13, a drive apparatus 14, a NIC (Network Interface Card) 15, an input/output apparatus 16, and a display apparatus 17, and similar. These devices are connected to each other via a bus.

The IO apparatus 16 processes various operational signals inputted from a keyboard or a mouse operated by a user, and controls input of image data from the scanner apparatus. The display apparatus 17 displays a GUI (Graphic User Interface), such as various windows, data, etc., necessary for a user to operate through a display of the computer 4. A NIC 15 serves as an interface for connecting the computer 4 to the network 8. For example, it includes a NIC (Network Interface Card), a MODEM, and a Bluetooth, and similar. Either wired or wireless connection is employed.

Program for operating a computer is either provided by a recording medium 18, such as a memory card, a CD-ROM, etc., or downloaded via the network 9. The recording medium 18 is set to a drive apparatus 14. Data and program are installed from the recording medium 18 to the HDD 13 through the drive apparatus 14. The computer 4 executes program installed in the HDD 13 through the user operation to achieve the below described functions.

Various functions of an electronic document creation device causing a computer to function as an electronic document creating apparatus is now described with reference to FIG. 4. As shown, an electronic document creation device is installed in the HDD 13 of the computer 4. The electronic document creation device is electronic document creation program that cooperates with the CPU 11, and includes a document information obtaining device 21, a electronic document extraction device 22, a document creation device 23, a document information notification device 24, a handwritten pattern extracting device, and a handwritten pattern overlay device 26. The other devices described in second and subsequent embodiments are executed by electronic document creation program.

The document information obtaining device 21 extracts document identification information 002 from image data inputted from the scanner apparatus 3, and obtains and decodes the document identification information specifying an electronic document corresponding to a sheet document 001. The electronic document extraction device 22 extracts an electronic document from the document database 6 based on the document information obtained by the document information obtaining device 21. The document creation device 23 creates a new electronic document from a plurality of electronic documents extracted by the electronic document extraction device 22. The document information notification device 24 notifies a user of a storage location of a new electronic document and similar by electronic mail or the like when the new electronic document is created.

Now, a sequence of creating an electronic document with the above-mentioned configuration is described with reference to FIG. 5. Initially, a user who intends to create a new electronic document receives authorization from a scanner apparatus or a computer 4 (S11). When the user inputs a user ID and a password, and sets an IC card to a card reader or the like, the scanner apparatus 3 and similar checks consistency with user authorization information such as a password stored previously.

Then, the user inputs an image of a sheet document 001 through the scanner apparatus 3 (S12). A sheet document 001 is exemplified in FIG. 6. The sheet document 001 includes document identification information as mentioned above. The document identification information 002 includes arrangement of a file ID of an electronic document, a number of page thereof, and an accumulated number of printing sheets of the page, and so on.

Such a numeric line is decoded to be a bar code or a two-dimensional code. In FIG. 5, if document identification information can be inputted, image data of the sheet document is not necessarily entirely inputted.

The document information obtaining device 21 decodes the document identification information 002 and obtains document information (S13). When the document identification information 002 is decoded and a location of a two-dimensional code is already known, only a rectangular region at a prescribed position is decoded. When a location of the two-dimensional code is unknown owing to layout of the sheet document 001, all of rectangular regions detected are decoded, and practically decoded one is recognized as sheet ID information.

Figure 7:
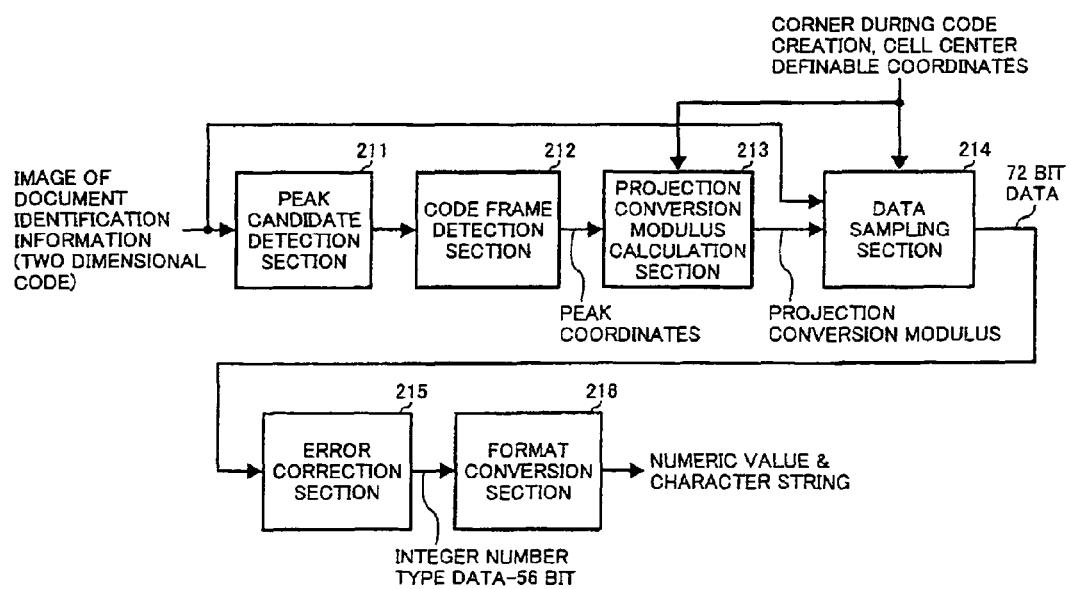
FIG. 7 illustrates an exemplary configuration of a document information obtaining device that extracts document identification information from image data.

Now, extraction of the document identification information 002 is described. As shown in FIG. 7, the document information obtaining device 21 includes a corner candidate detection section 211, a code frame detection section 212, a projection transformation modulus calculation section 213, a data sampling section 214, an error correction section 215, and a format conversion section 216.

The corner candidate detection section 211 detects a corner candidate of a two-dimensional code. The code frame detection section 212 detects a code frame as mentioned later based on the corner candidate. When a code frame is detected, the corner candidate is fixed as a real corner.

The projection transformation modulus calculation section 213 calculates a projection transformation modulus for mapping normalized center coordinates of respective cells of a two-dimensional code, which is created, to centers of the respective cells of a two-dimensional code, which is read.

Such a projection transformation modulus is determined from coordinates of respective corners in the code frame detected by the code frame detection section 212 and prescribed coordinates of respective corners in the code frame at a time of creating the two-dimensional code.

The data sampling section 214 samples data of a two-dimensional code using the projection transformation modulus calculated by the projection transformation modulus calculation section 213. An error correction section 215 determines if data thus read by the data sampling section 214 is erroneous. The error correction section 215 then outputs data having integer number type 56 bits other than an error correction code to a format conversion section 216 if the data is either correct or possible to be corrected. A format conversion section 216 converts the data while outputting a numeric character string.

Figure 8:
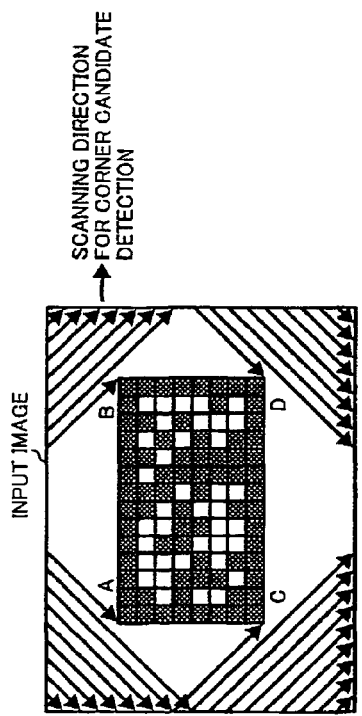
FIG. 8 illustrates an exemplary process for detecting corner candidates of an input image.

Now, an operation of a corner candidate detection section 211 is described in detail with reference to FIG. 8. As shown, a corner is detected by scanning an input image in a direction as shown by an arrow. Specifically, slant scanning is executed from four corners of the input image, and a black pixel is detected. Then, the detected black pixels define points A to D, respectively.

Figure 9:
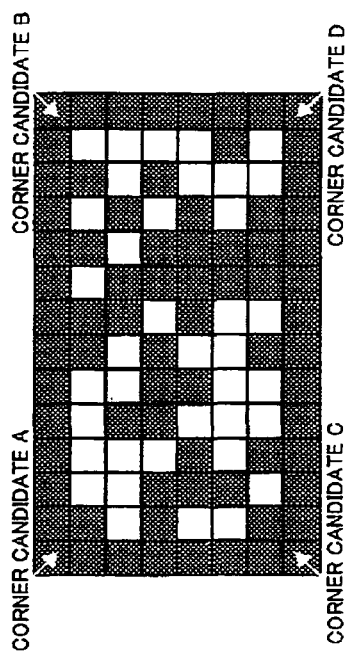
FIG. 9 illustrates an exemplary process detecting if it is a corner candidate.

Now, an operation of detecting if each of the points A to D is a corner candidate is described with reference to FIG. 9, where the two dimensional code is enlarged. As shown in FIG. 9, a corner candidate detection section 211 chases a number of pixels, which is $1/\sqrt{2}$ times of that on a side of a cell, in a direction from the corner candidates A to D to determine if all these point A to D are black pixels. Such chasing is performed either slanting to the right by the angle of 45 degree from the point A, or slanting to the left by the angle of 45 degree from the point B in relation to the two-dimensional code, for example. If each of the determination is positive, the corner candidate detection section 11 recognizes that the points A to D are the corner candidates, and the process is moved on to a code frame detection section 212.

Figure 10:
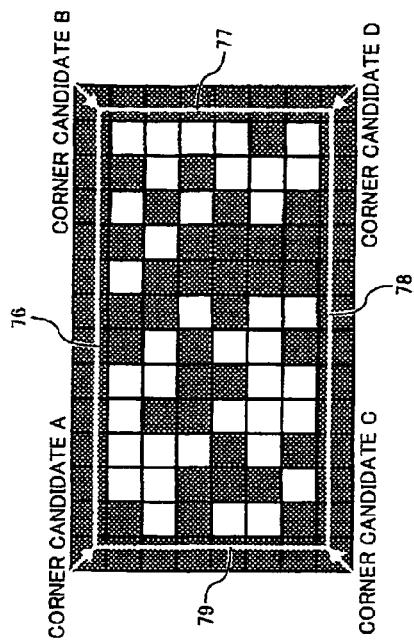
FIG. 10 illustrates an exemplary process determining if a code frame is present.

Now, the code frame detection section is described with reference to FIG. 10. As shown, the code frame detection section 212 determines as a code frame when black frame determination lines 76 to 79, extending through terminal ends, to which the $1/\sqrt{2}$ number of pixels are chased from the corner candidates A to D, are occupied by black pixels by more than 80% in respective straight lines. The code frame detection section 212 decides these corner candidates A to D as real corners, and detects respective coordinates of the real corners A to D.

When a document identification information is extracted in this way, the document information obtaining device 21 decodes the document identification information using a conventional technology as discussed in the Japanese Patent Application Laid Open No. 2005-122682.

Then, the electronic document extraction device 22 extracts a corresponding page of an electronic document from the document database 6 based on a file ID or the like obtained by the above-mentioned decoding (S14). Then, the document creation device 23 creates a new electronic document by putting one or more extracted electronic documents together (S15). Specifically, when the number of sheet documents 001 is one, one electronic document constitutes the new electronic document. When a plurality of sheet documents 001 are inputted, the plurality of sheet documents 001 constitute the new electronic document. The document creation device 23 puts a tag indicating document information, such as a number of pages, an original file ID, a date of creation of a new electronic document, etc., to the new electronic document and stores those in a prescribed folder.

Then, the document information notifying device 24 notifies a result if a new electronic document is created or the like to an authorized user by email (S16). A user allowed to input a sheet document 001 is previously registered in a computer 4 or an image inputting apparatus 7 (a MFP or the like), and an electronic mail address is already known. The document information notifying device 24 notifies a user of information related to a creation location and a creation name of a new electronic document when the new electronic document is created. The new electronic document transmitted to the user can be compressed and attached to the email. When a new electronic document is not completely created by the reason of unknown location or the like, such an effect and a missing page or the like are notified to a user. The new electronic document is hence created in such ways.

Further, a sheet document 001 sometime includes writing (hereinafter, referred to as a handwritten pattern), excluded from an electronic document. In such a situation, it is convenient if a new electronic document is created while reflecting the handwritten pattern as shown in FIGS. 11A and 11B.

Now, an electronic document creation device capable of extracting and reflecting a handwritten pattern into a new electronic document is described with reference to FIGS. 11A and 11B, wherein the same codes are assigned to the same configurations with those in FIG. 4, and descriptions thereof are omitted. An electronic document creation device is different from that in FIG. 4 by additionally including a handwritten pattern obtaining device 25 and a handwritten pattern overlay device 26.

An exemplary operation of extracting a handwritten pattern is described with reference to FIG. 11B. As shown, the handwritten pattern obtaining device 25 makes one page of the electronic document extracted by the electronic document extraction device 22 into a rasterized electronic document image, and compares it with image data inputted.

The handwritten pattern obtaining device 25 extracts a difference as a result of the comparison.

The handwritten pattern overlay device 26 overlays the obtained handwritten pattern on the corresponding electronic document as an object.

Now, a sequence of extracting and reflecting a handwritten pattern into a new electronic document is described with reference to FIG. 12, wherein the same numbers are assigned to the same steps of FIG. 5, and description thereof are omitted.

As shown, a handwritten pattern written into a sheet document 001 is obtained (S141) after a rasterized electronic document is obtained in step S14. A method of obtaining a handwritten pattern is now specifically described with reference to FIGS. 13 and 14.

In step S101, N number of regions, from which a handwritten pattern extraction is executed, and a size are set, while an electronic document and a correction added (e.g. a handwritten pattern) sheet document are inputted.

Figure 15A:
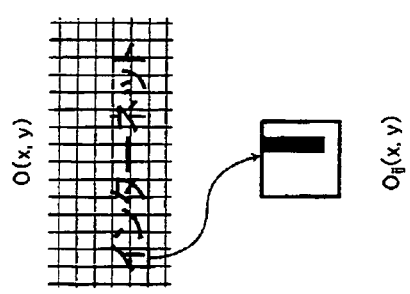
FIG. 15 is a chart showing regions created by dividing an extraction region O(x, y) of the electronic document in a grid state.

In step S102, numerical number 1 is set to a region number parameter "n". In step S103, a region is cut out from the sheet document as a handwritten pattern extraction objective, while a region corresponding to that is also cut out from the electronic document. In step S104, the electronic document cut out in step S103 is segmentized into M number of small regions as shown in FIG. 15A.

Figure 15B:
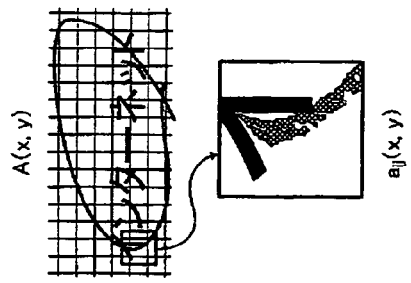

As shown, oij(x, y) is assigned to small regions of the thus extracted region o(x, y), which is cut out in step S103 and divided in a lattice shape. In step S105, numeral number 1 is set to a small region number parameter "m". In step S104, distribution of a correlation value between respective small regions and an image A (x, y) of the sheet document is calculated in order to determine positions in the sheet document, to which the small region oij (x, y) correspond. The sheet document is similarly segmentized as the electronic document in step S104 and aij (x, y) is assigned thereto. It is more efficient in term of calculation speed to calculate correlation values between regions oij (x, y) and aij (x, y) corresponding to each other in a virtual space as shown in FIG. 15B, wherein an extraction region A (x, y) is segmentized as the extraction region O(x, y), and the region aij (x, y) is extracted larger than the region oij(x, y) so as to determine a corresponding position.

As a result of the correlation value calculation, a relational position of an image taking the largest correlation value is regarded as the more probable position.

To always set a threshold value in subsequent steps regardless of a region, distribution of the correlation value calculated in step S106 is preferably independent from the total pixel values and area of respective small regions of an electronic document and a sheet document as shown in the below described first formula.

Specifically, the first formula always values from −0.1 to +0.1 regardless of an image size of oij(x, y) and aij(x, y), in particular, values from 0 to +1.0 for a digital image that takes a pixel value of either 0 or 1.

$$C(x',y') = \Sigma aij(x, y) \times oij(x-x', y-y') / \sqrt{(\Sigma |aij(x,y)|^2)} \times \sqrt{(\Sigma |oij(x-x', y-y')|^2)}$$

FIG. 15 illustrates difference processing of 3×3 pixel deviation applied between two images in step S107. In step S401, both the distribution C(x, y) of the correlation value calculated in step S106 as well as the most provable position (xm, ym) are inputted, and it is determined if the correlation value C (xm, ym) at the position (xm, ym) is larger than a prescribed threshold value Th1. If the determination is positive, the process goes to step S402. If it is negative, the process goes to step S108 passing through step S107. In steps S402 and S403, and steps S406 to S409, the difference processing is repeated at the position (xm, ym) and its peripheral 3×3 pixel regions. When a size of this region is to be changed, a setting value is changed in each of steps S402 and S403, an additional value is changed in each of steps S406 and S408, and/or a conditional value is changed in each of steps S407 and S409. In step S404, it is determined if the correlation value C(xm+x, ym+y) at the changed position (xm+x, ym+y) is larger than a prescribed threshold value Th2 (<Th1). If it is negative, the process goes to step S406 and changes an amount of deviation of a pixel. If the determination is positive, the process goes to step S405. Then, image difference processing is executed regarding that a positional relation between small regional images of two sheets of the sheet document image and the electronic document corresponds to a position (xm+x, ym+y).

Figure 16:
FIG. 16 illustrates exemplary expanded electronic document and sheet document images.

Such difference processing executed by using pixel deviation is necessitated by a difference in line width between the electronic document and sheet document images. Specifically, as shown in the left side picture in FIG. 16, when a line having a one dot girth on an electronic document is outputted onto a sheet, and taken in by a device such as a scanner as an image, the line becomes fat with local unevenness. This affects the difference processing and is recognized as an additional writing. Then, the above-mentioned difference processing with pixel deviation as executed in step S107 is more efficient than that executed by using a simple difference processing.

Figure 17:
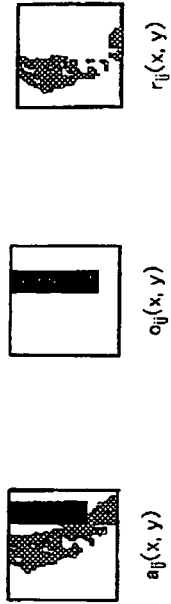
FIG. 17 illustrates an exemplary handwritten pattern image created by applying the above-mentioned processing to two small regions in the electronic document and sheet document images.

An example result of processing executed heretofore is illustrated in FIG. 17. The left side of FIG. 17 represents a small region of the sheet document image. The central picture in FIG. 17 represents a small region of the electronic document.

The right side of FIG. 17 represents a handwritten image created by applying the above-mentioned processing to the two small regional images. In step S108, it is determined if the small regional parameter m exceeds the upper limit M after the small region parameter m is incremented by 1.

If the determination is negative, the processing repeats from step S106.

In step S110, when processing is applied to all of the small regions, i.e., the above-mentioned small region parameter m exceeds the upper limit M, only an image with additional writing having received difference processing is created by inserting the image on a blank sheet image at a position extracted in step S103. After the regional numeral parameter n is incremented by one in step S111, it is determined if the "n" exceeds the upper limit N in step S112. If it is negative, processing is repeated from step S103. If it is positive, an additionally written image overlaid in step S110 is outputted in step S113.

By the above-mentioned processing, a handwritten pattern image extracted from the sheet document image by the handwritten pattern obtaining device 25 becomes a handwritten image created by a writer.

Back to FIG. 12, the handwritten pattern overlay device 26 then overlays the handwritten pattern on the electronic document as an object (S142) using a sticking function of a electronic document creation software such as word processor software, etc.

Specifically, as far as program of COM format of Windows™ is used, a module for sticking can be called from a macro function of software that creates an electronic document.

In particular, if an Add Picture method of a module called "Word Object Library" is used, an image can be inserted in an electronic document at an optional position. In this way, an electronic document with a handwritten pattern can be created.

Thus, the electronic document can be electronically handled while including a handwritten pattern having the equivalent information as the sheet document 001. The handwritten pattern itself is also electronically handled.

Thus, according to the above-mentioned embodiment, a new electronic document can be created only by inputting a sheet document through a scanner apparatus. Edition of the sheet document can be readily executed by a daily operation such as arrangement of sheets. Since a new electronic document is compact and is easily handled, an electronic document can be edited enjoying both advantages of the sheet and electronic documents.

A second exemplary embodiment is now described.

When a new electronic document is created by editing a sheet document 001 as in the first embodiment, electronic documents corresponding to the plurality of sheet documents 001 are not always created by the same application software. In such a situation, different application software is necessarily started up per page during the edition and is burdensome.

According to the second embodiment, an electronic document creation apparatus capable of converting and unifying various formats of newly created electronic documents is described with reference to FIG. 18.

In FIG. 18, exemplary functional blocks of an electronic document is described, wherein the same codes are assigned to the same configuration as those in FIG. 11, and the same description is omitted. An electronic document creation device includes a document format conversion device 101 and a page combination device 102.

The document format conversion device 101 converts and unifies various electronic document formats into a prescribed document format. There can be plural kinds of electronic documents and various formats corresponding to sheet documents inputted by the scanner apparatus 3. A document format to be unified is preferable if a conversion tool therefor is readily available.

For example, if an electronic document only includes text, TXT and Word™ formats are preferable. If it includes image data such as photograph, a PDF format or the like is exemplified.

The document format conversion device 101 converts respective pages of a new electronic document into a unified file format either based on a previously designated format or by automatically selecting a convertible format.

Further, the page combination device 102 combines and stores respective pages of the new electronic document of the unified file format. Further, the page combination device 102 includes a page sort device and a page information creation device. The page sort device sorts a combined new electronic document. An order of sorting is either descending or ascending orders of the following information:

Specifically, date when a sheet document 001 is inputted to a scanner apparatus 3, a time of creation of an electronic document, and update time of an electronic document, or the like are exemplified. Since the PDF format includes a page number, it is readily achieved to sort and combine a plurality of pages.

The page information creation device creates and administrates page information of new electronic documents as shown in FIG. 19. As shown, document identification information is stored linking with a page number. Further, a method of sorting a page number is recorded. Thus, the sorting method and original electronic documents of respective page numbers can be specified, if such page information is referred to.

An operation of creating a new electronic document by converting a document format and sorting pages is now described with reference to FIG. 20, wherein the same numbers are assigned to the same steps as those in FIG. 12, and the same description is omitted.

When a new electronic document is created in step S15, the document format conversion device 101 converts and unifies the format of the new electronic document into a prescribed format (S151). The conversion to the prescribed format is executed even if the new electronic document includes only one sheet.

Then, the page sort device sorts the new electronic document in a sort order either previously determined or designated by a user (S152), and combines the pages in the sorted order (S153).

Then, the page information creation device creates page information including numbers of respective pages and document identification information or the like linked with each other (S154). Then, the document information notifying device 24 determines if a new electronic document is created as in the first embodiment. If the determination is positive, the document information notifying device 24 notifies a location of creation of the new electronic document or the like to a user by email (S16).

Figure 20:
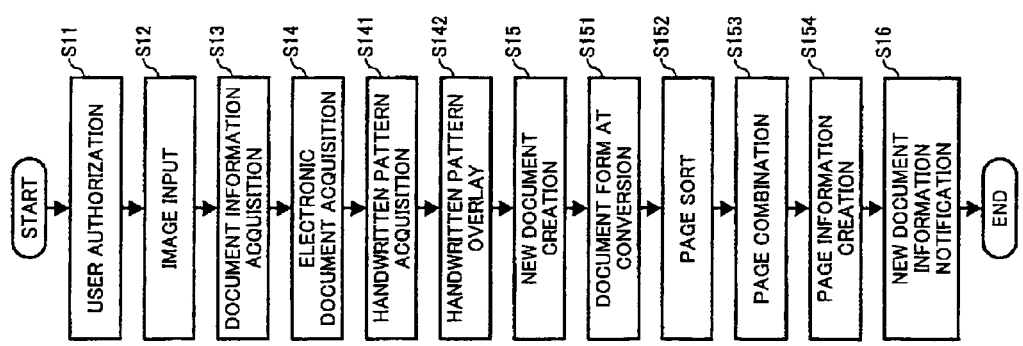
FIG. 20 is a flowchart illustrating an exemplary process for converting a document format while sorting pages thereby creating a new electronic document.

Although a step of procedure is started from image inputting in FIG. 20, the step can be started from converting a document format using a new electronic document when the new electronic document has been created. Further, the step of procedure can be started from page sorting when the document format has been converted.

According to the second embodiment, file formats for respective pages of the new electronic document can be unified. Further, since the new electronic document can be sorted in a desired order, user-friendliness of the electronic document creating apparatus can be improved.

Now, a third exemplary embodiment is described.

Figure 21:
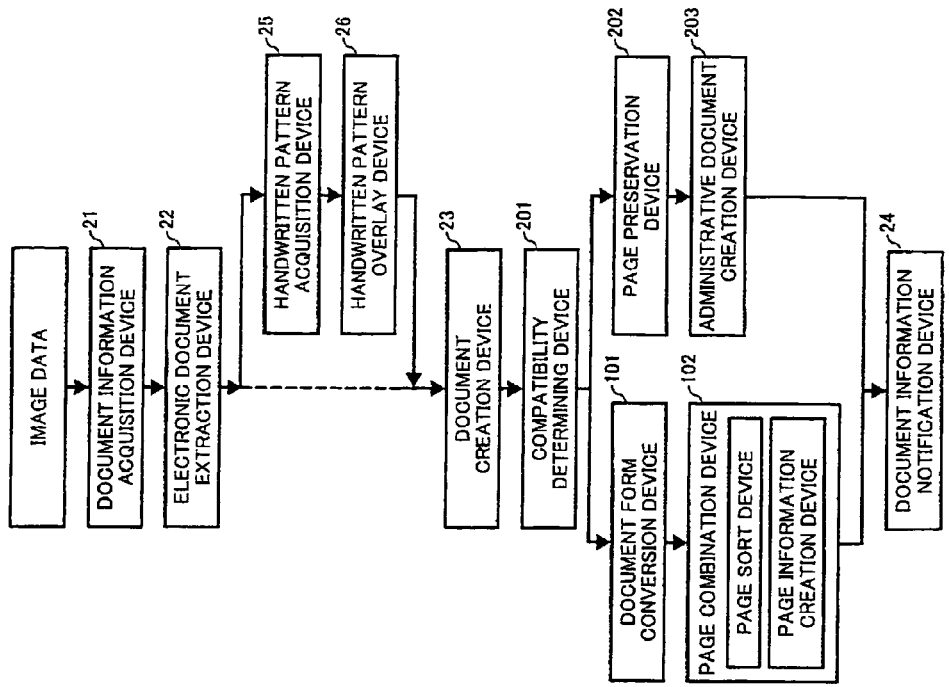
FIG. 21 illustrates exemplary functions of the electronic document creation device.

As mentioned heretofore, the second embodiment unifies a document format. However, it is rather convenient in many cases to handle a file format as originally is. Also, it is sometimes difficult to unify the file format. In this embodiment, a new electronic document is handled with a file format as originally is as shown in FIG. 21, wherein the same codes are assigned to the same configurations with those in FIG. 18, and descriptions thereof are omitted.

As shown, an electronic document creation device includes a compatibility determination device 201, a page storing device 202, and an administrative document creation device 203.

The compatibility determining device 201 determines a compatibility of a file format per page of a new electronic document. For example, the compatibility determining device 201 determines that it is compatible when each of pages includes a TXT (text) file, a RTF (rich text file), a Word® format file, because each of the files can be edited with one application software such as a Word®. The compatibility determining device 201 also determines that it is compatible when each of pages includes a Power Point® file, because the file can be edited with the one application software.

Such determination as to the compatibility is executed based on a file format of an electronic document, such as an extension, a header, etc. Further, presence or absence of the compatibility is determined by referring to a compatibility predetermination table as shown in FIG. 22A. The compatibility determining table includes registration of compatible file formats. Thus, when a file format of each page of a new electronic document is not registered in the compatibility determining table, the file is determined as incompatible.

The page storing device 202 stores electronic documents per page in a prescribed folder by an amount of input images. Specifically, the page storing device 202 stores the electronic document as is.

The administrative document creation device 203 collects and stores electronic document information, such as a file format of each of electronic documents, etc., in a folder as an administrative document, in which pages of the electronic documents are stored as shown in FIG. 22B. In the administrative document of FIG. 22B, a file format is stored linking with document identification information. As there shown, thumbnail images or storage locations can also be stored linking therewith. The thumbnail images are created by internally starting application software per format of an electronic document during notification to a user when the document creation device 23 has created a new electronic document.

The document format conversion device 101 can unify a file format, for example, by converting into a PDF file, even when a file is incompatible, during an operation of the page storing device 202. The page combination device 102 can change an order of respective pages of a new incompatible electronic document stored by the page storing device 202.

Now, an operation for creating a new electronic document in accordance with a compatibility of a new electronic document is described with reference to FIG. 23, wherein the same codes are assigned to the same configuration as those in FIG. 20, and the same description is omitted.

When a new electronic document is created in step S15, the compatibility determining device 201 determines if the new electronic document is compatible (S201). If the determination is positive (Yes, in step S201), the document format conversion device 101 converts each of pages into a unique format. For example, if a file format of the new electronic document is a TXT, a RTF, or a Doc, the document format conversion device 101 converts all of these into a RTF format. If it is a Power Point® file format, the document format conversion device 101 converts into a Power Point® related format file.

Then, page storage (S152), page combination (S153), and page information creation (S154) are executed, and a storage location of a new electronic document or the like is notified to a user (S16).

If the determination is negative (No, in step S201), i.e., an incompatible file format electronic document is mixed in, the page storing device 202 stores a new electronic document in a prescribed folder (S202), and the administrative document creation device 203 creates an administrative document based on the new electronic document (S203). Subsequently, page sorting (S152), page combination (S153), and page information creation (S154) are executed, and a storage location of the new electronic document or the like is notified to a user (S16).

By determining if compatibility is present through the above-mentioned processing, a new electronic document is stored in an appropriate file format.

Further, it is convenient if each page of a new electronic document stored is looked through when a new incompatible electronic document is stored. According to this embodiment, to look through the respective pages of the new incompatible electronic document, an electronic document display device capable of looking through the respective pages of the electronic document is provided to a user.

For example, when the document information notifying device 16 notifies a user of creation of a new electronic document, an electronic document display program causing a computer to function as an electronic document creation device is transmitted along with an email. Otherwise, a storage location of an electronic document display program is notified by means of a URL or the like so that browser software can display.

Figure 24:
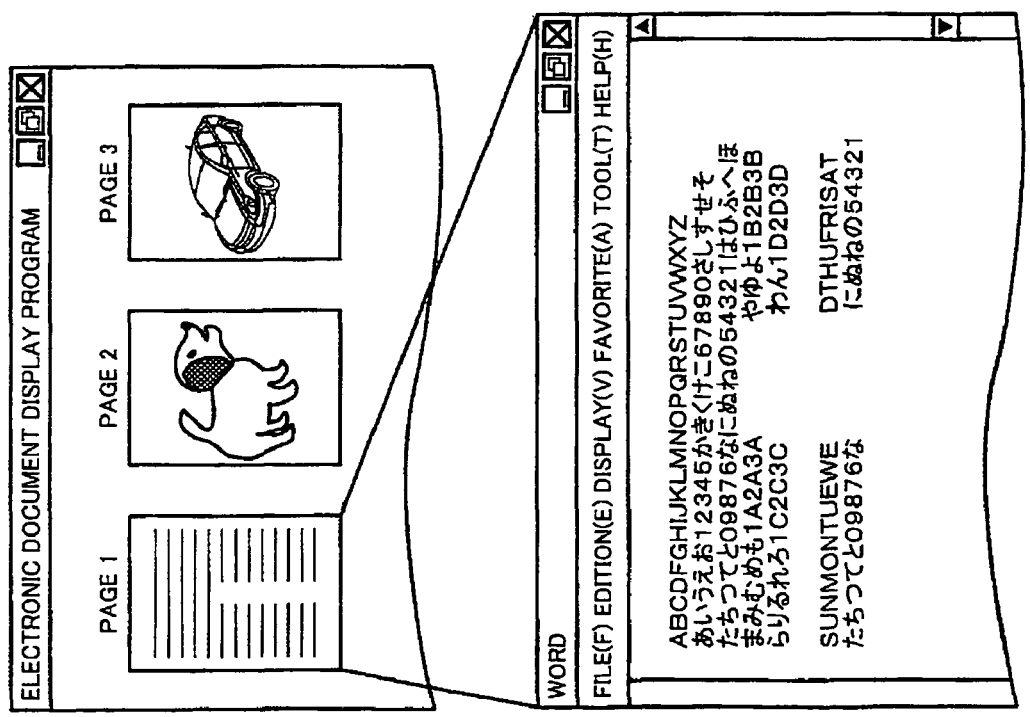
FIG. 24 illustrates an exemplary computer screen with a thumbnail display showing a new incompatible electronic document by means of an electronic document display program.

An exemplary computer screen with a thumbnail display on which an incompatible new electronic document is displayed by electronic document display program is described with reference to FIG. 24. As shown, since a new electronic document is displayed per page in an order of pages, a user can look through a content of the new electronic document without starting appropriate application software.

When a user selects a thumbnail image with a mouse or the like, application software capable of editing the electronic document starts. Specifically, in FIG. 24, the first page is selected, and the Word® starts, and a page of a new electronic document is displayed.

An administrative document is stored in the same folder as the new electronic document. A file format of the electronic document of the thumbnail image is well known, and is linked to application software capable of editing the file in accordance with the file format. For example, when the second page includes a BMP (bit map) file, it is generally linked to Paint software, and when the third page includes a PDF Me, it is linked with Acrobat® software. Accordingly, as shown in FIG. 24, only by selecting with a mouse, application software capable of editing an applicable page of a new electronic document can be started.

As mentioned heretofore, according to this embodiment, a new electronic document can be stored in an appropriate format while determining presence of compatibility, and each of the incompatible electronic documents can be easily edited.

A fourth exemplary embodiment is now described with reference to FIG. 25.

In the above-mentioned first to third embodiments, an electronic document (e.g. all of A-4 size sheet) is entirely used to create a new electronic document. However, it is sometimes desired to partially edit a prescribed page. In such a situation, it is easily handled and a file is down sized if only a desired portion is used to create a new electronic document.

Figure 25:
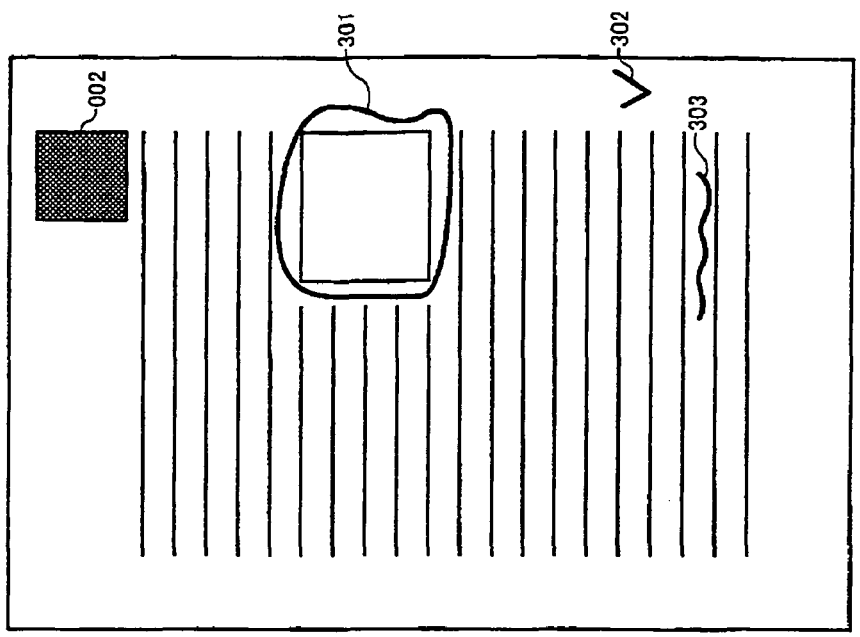
FIG. 25 illustrates an exemplary sheet document with a handwritten sheet document marker 301.

Specifically, a user writes a mark in a desired portion on a sheet document by hand as shown in FIG. 25, wherein a marker 301 is handwritten on a sheet document 001. When the marker surrounds a picture portion, for example, such a region is determined to be desired by a user.

Any marks can be employed, such as a check marker 302, an underlined marker 303, a bracket marker, etc.

To detect a handwritten marker, a handwritten pattern is obtained. Since a handwritten pattern as a marker and the other type handwritten pattern do not appear on an electronic document, a handwritten pattern obtaining device 25 necessarily detects as differences. Then, the handwritten pattern obtaining device 25 stores a standard marker in advance to be recognized as a marker, and recognizes a handwritten similar to the standard marker as a marker among obtained handwritten patterns.

Almost functional blocks of the electronic document creation device are similar to those in FIG. 11. However, the handwritten pattern obtaining device of this embodiment includes a marker detection device to detect a marker. When a handwritten pattern obtaining device 25 is included, functional blocks illustrated in FIGS. 18 and 21 can be used.

Now, an exemplary operation of creating a new electronic document when a sheet document 001 partially includes a marker and a handwritten pattern is described with reference to FIG. 26, wherein the same numbers are assigned to the same steps with those in FIG. 12, and descriptions thereof are omitted.

For example, when a sheet document as shown in FIG. 27A is inputted, since a loop state marker 301 and an underlined handwritten pattern 50 are handwritten on the sheet document, the loop state marker 301 and the underlined handwritten pattern 50 are obtained in step S141 as illustrated in FIG. 27B.

The marker detection device determines if there is a marker registered among the handwritten patterns (S300). One or more markers to be detected are registered as shown in FIG. 27C, wherein a name of a marker, such as a closed line, a check mark, a bracket, etc., and their standard patterns are registered. The marker detection device determines if the marker 301 and the pattern 50 correspond to the registered marks in turn.

A determination if it is recognized as a mark is executed by either extracting a characteristic point of a handwritten pattern and comparing a characteristic vector with a registered marker, or executing a well-known pattern matching, such as a template matching, etc. The marker 301 is recognized as a marker in FIG. 27B.

If there is a registered marker (Yes, in step S300), the document creation device 23 extracts a region designated by a marker (S301). The region designated by the marker is one of an inside of a closed curving line, a line including a check mark, and a region surrounded by a bracket or the like.

The document creation device 23 extracts an object or text data if it is included in the region surrounded by the marker 301 (S15). Accordingly, the document creation device 23 obtains the object and so on in the extracted region as attached to the electronic document as a new electronic document of Jpeg, BMP or the like.

If the marker does not exist, a new electronic document uses the entire page as in the first embodiment. Further, if only a handwritten pattern or a combination of a handwritten pattern and a marker exists, the handwritten pattern is extracted and is overlaid on a new electronic document. The document creation device 23 attaches a tag indicating a page number or document information to a new electronic document and stores it in a prescribed folder.

Subsequently, the document information notifying device 24 notifies a determination result if a new electronic document is created to a user authorized through an email (S16).

As mentioned heretofore, the electronic document creating apparatus of this embodiment can extract an object of a necessary portion when only the portion on a sheet document 001 with a marker is selected, objects within the portions are extracted, thereby a scrap book like operation is performed.

Figure 28:
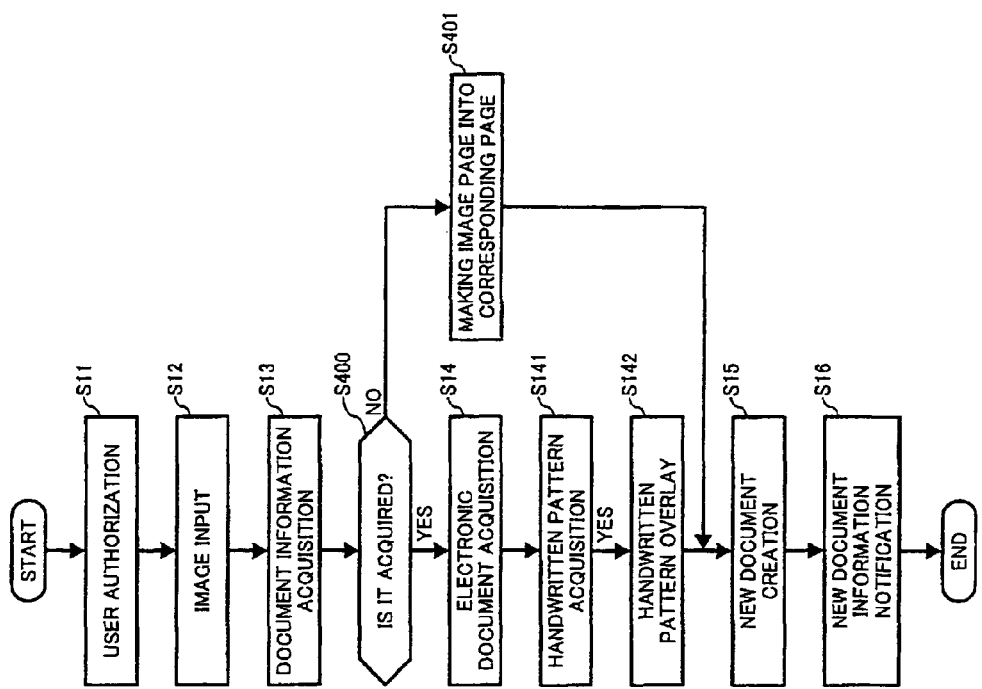
FIG. 28 is a flowchart illustrating an exemplary process for creating a new electronic document when a sheet document, in which identification information is not available, is included.

A fifth exemplary embodiment is now described with reference to FIG. 28.

In this embodiment, an example in which document identification information can't be obtained from a sheet document 001 is described. It is supposed in a practical usage that a sheet document excluding a printing of document identification information is handled together with that including the printing.

In such a situation, it is convenient that the sheet document excluding the printing document ID information is stored together as image data. Then, this embodiment employs the electronic document creation device of FIG. 11.

An operation of creating a new electronic document when a sheet document from which document identification information can't be obtained is included is described with reference to FIG. 28, wherein the same numbers are assigned to the same steps with those in FIG. 12, and thereby descriptions thereof are omitted.

In step S13, the document information obtaining device 21 extracts document identification information 002, and determines if document information can be obtained (S400).

The document information is not obtained, if the document identification information 002 is damaged or not printed (No, in step S400).

In this situation, to equally handle image data inputted from the scanner apparatus 3 with a corresponding electronic document as the other sheet document, the document creation device 23 puts a tag to the image data so that it is handled as a page of a new electronic document (S401). Then, it is stored as one page electronic document in a prescribed folder. Since an original electronic document does not exist, additional writing (e.g. correction) and extraction are omitted. An operation executed when the document identification information is obtained has been described earlier with reference to FIG. 12, and accordingly, is not repeated here.

As mentioned above, according to this embodiment, when an electronic document corresponding to a sheet document is included as determined from the document identification information, it can be edited to create a new electronic document. Further, it is equally handled with an electronic document by putting a tag to image data even when document identification information is not obtained.

As mentioned heretofore, an electronic document creation apparatus according to the several embodiments enables extraction of a desired portion from a sheet material and creation of a new electronic document. Thus, a new electronic document can be created only by inputting document identification information on a sheet material. Further, a file format of each of pages of a new electronic document can be unified.

Compatibility (of a file) is determined and an electronic document can be administrated by an administrative document that administrates each of pages when the compatibility is absent.

When the compatibility is present, an electronic document is converted into one file format. A new electronic document can be sorted in an order of inputting of sheet documents or a creation date of an electronic document. When a handwritten pattern is included in a sheet document, the handwritten pattern is extracted. Further, when a prescribed handwritten marker is detected, a new electronic document is created based on a region only designated by the marker.

Obviously, numerous additional modifications and variations of the present disclosure are possible in light of the above teachings. It is therefore to be understood that within the scope of the appended claims, the present disclosure may be practiced otherwise than as specifically described herein. For example, elements and/or features of different examples and illustrative embodiments may be combined with each other and/or substituted for each other within the scope of this disclosure and appended claims.

This application claims priority under 35 USC §119 to Japanese Patent Application No. 2005-292515, filed on Oct. 5, 2005, the entire contents of which are herein incorporated by reference.

What is claimed is:

1. An electronic document creating apparatus, comprising:
 a document identification information obtaining device configured to obtain and input document identification information put on a sheet document, by scanning the sheet document, said document identification information identifying an electronic document per page stored in a storage section of a database serving as an output source of the sheet document, said document identification information including information representing the storage section and the page of the electronic document;

an electronic document extraction device configured to extract at least two pages of electronic documents from respective different sections specified by the document identification information obtained by scanning a plurality of sheet documents different from each other; and a new document creation device configured to create new electronic documents by connecting the at least two pages of the electronic documents read from the respective different storage sections, in a prescribed order of pages, said new electronic document being stored in a prescribed storage section of the database.

2. The electronic document creating apparatus as claimed in claim 1, wherein said document identification information includes a serial number of the electronic document, wherein said document identification information obtaining device obtains and inputs the document identification information together with image data of the sheet document, and wherein the electronic document extraction device extracts the electronic document based on the document identification information.

3. The electronic document creating apparatus as claimed in claim 2, wherein said new document creation device creates a new electronic document by combining image data of the sheet document and an electronic document when the document identification information obtaining device cannot obtain and input the document identification information.

4. The electronic document creating apparatus as claimed in claim 1, further comprising a document information notifying device configure to notify a user when the new electronic document is created and a storage location of the new electronic document.

5. The electronic document creating apparatus as claimed in claim 2, further comprising:
a handwritten pattern obtaining device configured to obtain a handwritten pattern written on the sheet document by comparing image data of the sheet document including a handwritten pattern with image data of the corresponding electronic document identified based on the document identification information; and
a pattern overlay device configured to overlay the handwritten pattern obtained by the handwritten pattern obtaining device on the electronic document.

6. The electronic document creating apparatus as claimed in claim 1, wherein said electronic document creation device includes a document format conversion device configured to unify a different file format.

7. The electronic document creating apparatus as claimed in claim 1, further comprising an administrative document creation device configured to create an administrative document by collecting at least file format information of the electronic document, said administrative document creation device storing the administrative document in the database with links to respective pages of the new electronic document.

8. The electronic document creating apparatus as claimed in claim 1, further comprising:
a compatibility determination device configured to determine if a file format of each page of the new electronic document is compatible with remaining pages of the new electronic document; and
a document format conversion device configured to convert said each page of the new electronic document into the same file format when the determination is positive.

9. The electronic document creating apparatus as claimed in claim 8, further comprising a page sort device configured to sort each of the pages of the new electronic document, wherein said page sort device assigns a page number to each of the pages of the new electronic document in an order based on at least one of sheet document input time, creation date of an electronic document, and date of updating an electronic document.

10. An electronic document creating apparatus, comprising:
a document information obtaining device configured to obtain document identification information put on a sheet document, by scanning the sheet document, said document identification information identifying an electronic document per page stored in a storage section of a database serving as an output source of the sheet document, said document identification information including information representing the storage section and the page of the electronic document;
an electronic document extraction device configured to extract at least two pages of electronic documents from respective different sections specified by the document identification information obtained by scanning a plurality of sheet documents different from each other;
a marker detection device configured to obtain a marker additionally written on the sheet document by comparing image data of the sheet document with image data of the electronic document extracted based on the document identification information; and
a new document creation device configured to extract and store information within a region designated by the marker as a prescribed file, and create new electronic documents by connecting the at least two pages of the electronic documents read from the respective different storage sections, in a prescribed order of pages, said new electronic documents being stored in a prescribed storage section of the database.

11. The electronic document creating apparatus of claim 10, wherein the marker includes at least one of a check mark, a bracket, a square, a closed curving line, and an underline mark.

12. A method for creating an electronic document, comprising the steps of:
(a) obtaining document identification information put on a sheet document by scanning the sheet document, said document identification information specifying identifying an electronic document per page stored in a storage section of a database serving as an output source of the sheet document, said document identification information including information representing the storage section and the page of the electronic document;
(b) extracting at least two pages of electronic documents from respective different sections specified by the document identification information obtained by scanning a plurality of sheet documents different from each other; and
(c) creating new electronic documents by connecting the at least two pages of the electronic documents read from the respective different storage sections, in a prescribed order of pages, said new electronic documents being stored in a prescribed storage section of the database.

* * * * *